United States Patent
Dai et al.

(10) Patent No.: US 10,535,180 B2
(45) Date of Patent: Jan. 14, 2020

(54) METHOD AND SYSTEM FOR EFFICIENT RENDERING OF CLOUD WEATHER EFFECT GRAPHICS IN THREE-DIMENSIONAL MAPS

(71) Applicant: Robert Bosch GmbH, Stuttgart (DE)

(72) Inventors: Zeng Dai, Sunnyvale, CA (US); Liu Ren, Cupertino, CA (US); Lincan Zou, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/938,726

(22) Filed: Mar. 28, 2018

(65) Prior Publication Data
US 2019/0304159 A1     Oct. 3, 2019

(51) Int. Cl.
| G06T 15/04 | (2011.01) |
| G06T 19/20 | (2011.01) |
| G06T 17/05 | (2011.01) |
| G08G 1/0967 | (2006.01) |
| G06T 13/60 | (2011.01) |

(52) U.S. Cl.
CPC ............. *G06T 15/04* (2013.01); *G06T 13/60* (2013.01); *G06T 17/05* (2013.01); *G06T 19/20* (2013.01); *G08G 1/0967* (2013.01); *G06T 2219/2012* (2013.01)

(58) Field of Classification Search
None
See application file for complete search history.

(56) References Cited

U.S. PATENT DOCUMENTS

| 5,469,535 A | 11/1995 | Jarvis et al. |
| 6,268,861 B1 | 7/2001 | Sanz-Pastor et al. |
| 6,384,830 B2 | 5/2002 | Baron et al. |
| 6,788,304 B1 | 9/2004 | Hart et al. |

(Continued)

FOREIGN PATENT DOCUMENTS

| EP | 1953701 A1 | 8/2008 |
| WO | 9963489 A1 | 12/1999 |

OTHER PUBLICATIONS

Schneider, Andrew et al., "The Real-Time Volumetric Cloudscapes of Horizon: Zero Dawn", Advances in Real-Time Rendering 2015, SIGGRAPH 2015 (99 pages).

(Continued)

*Primary Examiner* — Said Broome
(74) *Attorney, Agent, or Firm* — Maginot, Moore & Beck LLP

(57) ABSTRACT

A method for displaying graphics of clouds in a three-dimensional (3D) virtual environment includes generating a filtered texture based on a threshold filter applied to a cloud texture where the filter threshold corresponds to cloud coverage information in weather data of a geographic region. The method further includes mapping the filtered texture to a geometric surface corresponding to a sky dome in the 3D virtual environment, coloring a plurality of texels in the mapped filtered texture on the geometric surface stored in the memory based on an isotropic single-scatter color model, and generating a graphical depiction of the 3D virtual environment including at least a portion of the geometric surface corresponding to the sky dome with clouds based on the plurality of texels of the filtered texture that are colored and mapped to the geometric surface.

14 Claims, 5 Drawing Sheets

(56) References Cited

U.S. PATENT DOCUMENTS

| | | | |
|---|---|---|---|
| 6,961,061 B1 | 11/2005 | Johnson et al. | |
| 7,724,258 B2 | 5/2010 | Ebert et al. | |
| 9,752,889 B2 | 9/2017 | Ren et al. | |
| 2006/0176303 A1* | 8/2006 | Fairclough | G06T 15/50 345/426 |
| 2006/0253246 A1 | 11/2006 | Cera et al. | |
| 2010/0265125 A1* | 10/2010 | Kelly | G01S 7/04 342/179 |
| 2015/0178946 A1* | 6/2015 | Krishnaswamy | G06K 9/46 345/582 |
| 2017/0154460 A1 | 6/2017 | Hu | |

OTHER PUBLICATIONS

Biagioli, Adrian, "Understanding Perlin Noise", Aug. 9, 2014, flafla2.github.io/2014/08/09/perlinnoise.html, retrieved Mar. 28, 2018 (14 pages).

"Mie Scattering", Wikipedia, Jan. 27, 2018, https://en.wikipedia.org/wiki/Mie_scattering, retrieved Mar. 28. 2018 (7 pages).

* cited by examiner

METHOD AND SYSTEM FOR EFFICIENT RENDERING OF CLOUD WEATHER EFFECT GRAPHICS IN THREE-DIMENSIONAL MAPS

FIELD

This disclosure relates generally to the field of driver information and driver assistance systems (also known as in-vehicle information systems) and, more specifically, to systems and methods that provide graphical displays to a vehicle operator for mapping and navigation applications.

BACKGROUND

Unless otherwise indicated herein, the materials described in this section are not prior art to the claims in this application and are not admitted to the prior art by inclusion in this section.

Modern motor vehicles often include one or more driver information and driver assistance systems (hereinafter referred to as in-vehicle information systems) that provide a wide variety of information and entertainment options to occupants in the vehicle. Common services that are provided by the in-vehicle information systems include, but are not limited to, vehicle state and diagnostic information, mapping and navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

Three-dimensional (3D) graphics methods have been widely used in different driver assistance and driver information applications. One typical example is navigation systems based on 3D maps. Compared with traditional two-dimensional (2D) maps, 3D maps are considered to be more helpful for easy driver orientation and fast location recognition. For example, photorealistic 3D mapping and navigation services are provided by multiple online and offline services including services offered by Apple, Google, and Nokia. Modern 3D graphics can produce a wide range of highly realistic graphical effects. In the context of 3D mapping and navigation applications, a graphics display system can generate landmarks such as geographic features, streets, buildings, and other landmarks in great detail. Furthermore, some 3D mapping systems can apply graphical effects that depict the weather and lighting conditions in the 3D virtual environment that correspond to the actual weather conditions in the real geographic region that is reproduced in the mapping application. For example, 3D graphics systems can produce graphical renderings of clouds based on the current weather conditions in a geographic region.

While modern 3D graphics hardware and software is capable of reproducing a wide range of graphics, the generation of graphical effects such as clouds typically requires substantial hardware execution resources to produce the graphical effects with a reasonable rendering speed for use in a 3D mapping application. Modern processing devices including graphics processing units (GPUs) that can perform complex graphical rendering of realistic three-dimensional clouds exist, but many hardware platforms including the graphics systems that are integrated into motor vehicles and those of inexpensive mobile electronic devices may lack the necessary hardware to produce realistic graphical depictions of clouds. Furthermore, even some mobile electronic devices that now include increasingly powerful graphics hardware may consume an undesirably large amount of electrical power to produce the graphics, which often results in a drained battery that can be counterproductive to the use of a mapping application when traveling. Consequently, improvements methods and systems that render of clouds in three-dimensional virtual environments to produce a graphical rendering of the cloud cover in a geographic region in a computationally efficient manner would be beneficial.

SUMMARY

In one embodiment, a method for generating graphics of a three-dimensional (3D) virtual environment has been developed. The method includes receiving, with a processor, weather data including cloud coverage information corresponding to a geographic region, retrieving, with a processor, a texture corresponding to clouds from a memory, generating, with the processor, a filtered texture based on a threshold filter applied to the texture, the generating including a filter threshold that corresponds to the cloud coverage information in the weather data, mapping, with the processor, the filtered texture to a geometric surface corresponding to a sky dome in the 3D virtual environment, coloring, with the processor, a plurality of texels in the mapped filtered texture on the geometric surface stored in the memory based on an isotropic single-scatter color model, and generating, with a display device connected to the processor, a graphical depiction of the 3D virtual environment corresponding to the geographic region including at least a portion of the geometric surface corresponding to the sky dome with clouds based on the plurality of texels of the filtered texture that are colored and mapped to the geometric surface.

In another embodiment, a method for generating graphics of a three-dimensional (3D) virtual environment has been developed. The method includes receiving, with a processor, weather data including cloud coverage information, wind speed information, and wind direction information corresponding to a geographic region, retrieving, with a processor, a first texture corresponding to clouds from a memory, retrieving, with a processor, a second texture corresponding to clouds from the memory, the second texture being different than the first texture, generating, with the processor, a third texture corresponding a combination of the first texture and the second texture with a first offset between the first texture and the second texture corresponding to the wind speed information, and the wind direction information, generating, with the processor, a first filtered texture based on a threshold filter applied to the third texture, the generating including a filter threshold that corresponds to the cloud coverage information in the weather data, mapping, with the processor, the first filtered texture to a geometric surface corresponding to a sky dome in the 3D virtual environment, coloring, with the processor, a plurality of texels in the mapped first filtered texture on the geometric surface stored in the memory based on an isotropic single-scatter color model, and generating, with a display device connected to the processor, a first graphical depiction of the 3D virtual environment corresponding to the geographic region including at least a portion of the geometric surface corresponding to the sky dome with clouds based on the plurality of texels of the first filtered texture that are colored and mapped to the geometric surface. The method further includes generating, with the processor, a fourth texture corresponding to another combination of the first texture and the second texture with a second offset between the first texture and the second texture corresponding to the wind speed information, and the wind direction information, the second offset being different than the first offset, generating, with the processor, a second filtered texture based on the threshold filter applied to the fourth texture, the generating including the filter threshold that corresponds to the cloud coverage information in the weather data, mapping, with the processor, the second filtered texture to the geometric surface corresponding to a sky dome in the 3D virtual environment, coloring, with the processor, a plurality of texels in the mapped second filtered texture on the geometric surface stored in the memory based on the isotropic single-scatter color model, and generating, with the display device, a second graphical depiction of the 3D virtual environment corresponding to the geographic region including at least a portion of the geometric surface corresponding to the sky dome with clouds based on the plurality of texels of the second filtered texture that are colored and mapped to the geometric surface to produce an animated depiction of the clouds.

In another embodiment, a system for generating graphics of a three-dimensional (3D) virtual environment has been developed. The system includes a display device, a network device, a memory, and a processor operatively connected to the display device, the network device, and the memory. The memory is configured to store programmed instructions, a texture corresponding to clouds, and a geometric surface corresponding to a sky dome in the 3D virtual environment. The processor is configured to execute the programmed instructions to receive weather data including cloud coverage information corresponding to a geographic region using the network device, retrieve the texture corresponding to clouds from the memory, generate a filtered texture based on a threshold filter applied to the texture, the generating including a filter threshold that corresponds to the cloud coverage information in the weather data, map the filtered texture to a geometric surface corresponding to a sky dome in the 3D virtual environment, color a plurality of texels in the mapped filtered texture on the geometric surface stored in the memory based on an isotropic single-scatter color model, and generate a graphical depiction of the 3D virtual environment corresponding to the geographic region including at least a portion of the geometric surface corresponding to the sky dome with clouds based on the plurality of texels of the filtered texture that are colored and mapped to the geometric surface using the display device.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "texture" refers to a set of image data that is applied to a surface in a three-dimensional virtual environment to produce a graphical effect. This application describes embodiments that use textures to generate graphical effects corresponding to clouds. As used herein, the term "texel" refers to a pixel of image data that is contained within a texture.

Figure 1:
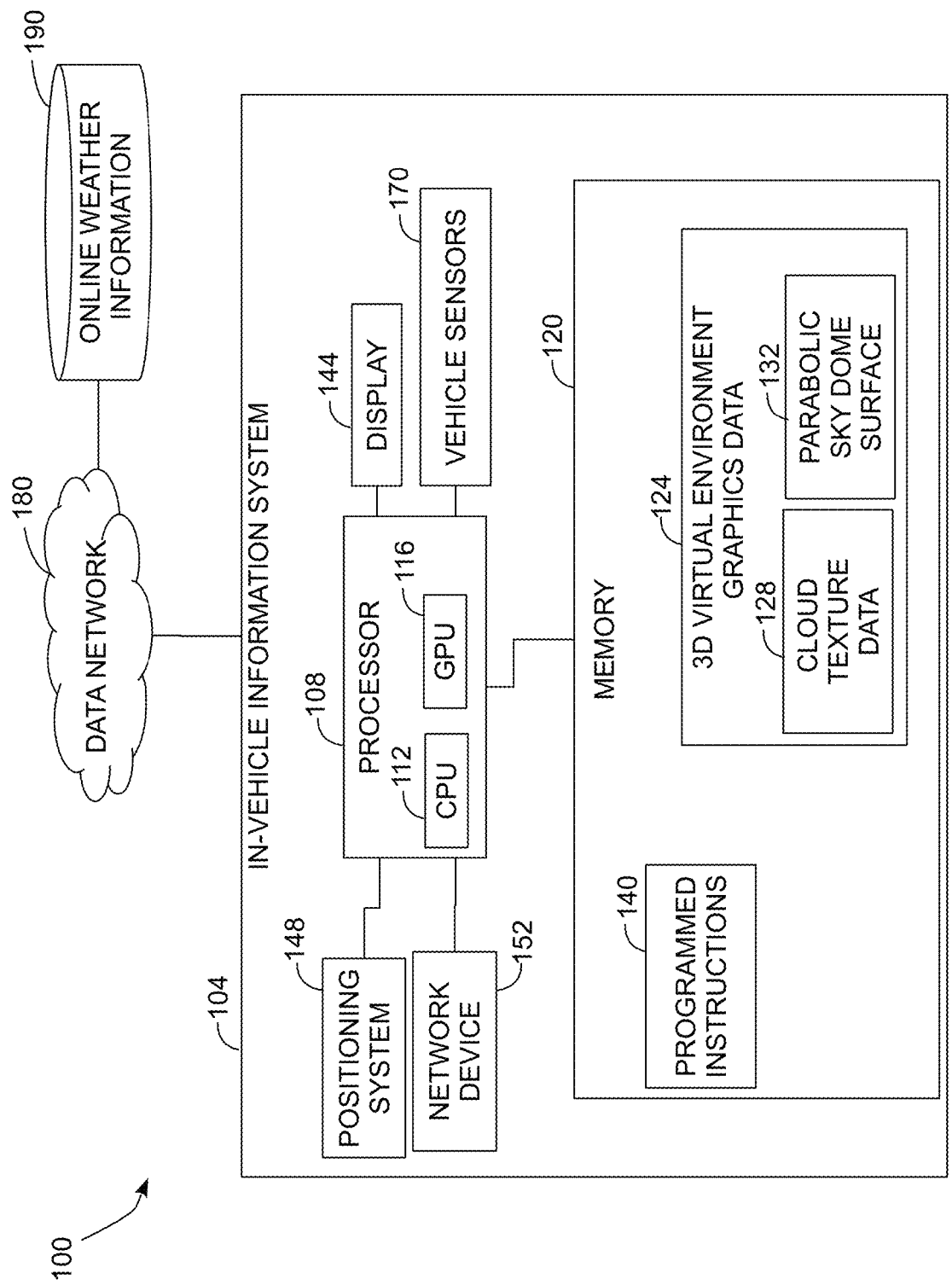
FIG. 1 is a schematic diagram of an in-vehicle information system that is configured to generate a display of a three-dimensional (3D) virtual environment including clouds in the 3D virtual environment.

FIG. 1 depicts a system 100 that includes an in-vehicle information system 104 that generates a graphical display of a three-dimensional (3D) virtual environment including a representation of the sky and clouds that reflect weather conditions in a real-world geographic location in a computationally efficient manner. The in-vehicle information system 104 includes a processor 108 that is operatively connected to a memory 120, display device 144, optional positioning system 148, network device 152, and optional vehicle sensors 170. Hardware embodiments of the in-vehicle information system 104 include, but are not limited to, personal computer (PC) hardware, embedded system hardware including embedded computing hardware for use in a motor vehicle, and mobile electronic devices including smartphone and tablet computing devices. In the system 100, a wireless data network 180 connects the in-vehicle information system 104 to one or more online weather information sources 190.

In the in-vehicle information system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device, while in other embodiments the CPU 112 and GPU 116 are connected to each other via a peripheral connection device such as PCI express or another suitable peripheral data connection. In one embodiment, the CPU 112 is a commercially available central processing device that implements an instruction set such as one of the x86, ARM, Power, or MIPS instruction set families. The GPU 116 includes hardware and software for display of both 2D and 3D graphics. In one embodiment, processor 108 executes software programs including drivers and other software instructions using the hardware functionality in the GPU 116 to generate 3D graphics using, for example, the OpenGL, OpenGL ES, Vulkan, or Direct3D graphics application programming interfaces (APIs). For example, the GPU 116 includes one or more hardware execution units that implement texture mapping, fragment shaders, vertex shaders, and optionally geometry shaders, tessellation shaders, and compute shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications. The stored program instructions 140 include software that control the operation of the CPU 112 and the GPU 116 to generate graphical depictions of clouds based on the embodiments described herein.

The processor 108 executes the mapping and navigation program and generates 3D graphical output with graphical transformations that depict map features and weather conditions such as cloud cover in the sky in a geographic region that is external to the vehicle an intuitive manner. The processor 108 is configured with software and hardware functionality by storing programmed instructions in one or memories operatively connected to the processor 108 and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the in-vehicle information system 104. In some embodiments the GPU 116 and the CPU 112 each have access to separate RAM devices (e.g. a variant of DDR SDRAM for the CPU 112 and a variant of GDDR, HBM, or other RAM for the GPU 116) while in other embodiments the CPU 112 and GPU 116 access a shared memory device. In addition to the programmed instructions 140, the memory 120 stores three dimensional virtual environment graphics data 124. The graphics data 124 include geometric models, textures, and other data that the processor 108 uses to generate three-dimensional graphics of a 3D virtual environment. In the embodiment of FIG. 1, the graphics data 124 includes one or more textures in the cloud texture data 128 that correspond to the structure of clouds that are displayed in the sky of the 3D virtual environment. The graphics data 124 also includes a parabolic sky dome surface 132 that forms a geometric surface representing the sky in the 3D virtual environment. During operation of the in-vehicle information system 104, the processor 108 modifies the cloud texture data 128 based on the current or predicted weather conditions in a geographic region that is represented by the 3D virtual environment and maps the textures to the parabolic sky dome surface for display in the in-vehicle information system 104.

The in-vehicle information system 104 includes an optional network device 152 that is configured to send and receive weather data from external computing systems, such as the online weather information sources 190, through a data network 180. Examples of the network device 152 include wired network adapters such as Ethernet and universal serial bus (USB) adapters, and wireless network adapters such as wireless wide area network (WWAN), 802.11 or Bluetooth wireless local area network (WLAN) adapters.

As depicted in FIG. 1, the online weather information sources 190 include any online service that provides data in a manner that is accessible by the in-vehicle information system 104 through the data network 180. For example, online weather information sources 190 include live weather services that provide information related to the weather around vehicle, including cloud, wind, temperature, precipitation, and road hazard conditions.

The in-vehicle information system 104 includes an optional positioning system device 148 that is operatively connected to the processor 108. Examples of positioning systems include global positioning system (GPS) receivers that use one or more satellite navigation systems, radio triangulation receivers that identify a location of the in-vehicle information system 104 with respect to fixed wireless transmitters, and inertial navigation systems. During operation, the processor 108 executes mapping and navigation software applications that retrieve location information from the positioning system 148 to identify a geographic location of the in-vehicle information system 104 and to adjust the display of the virtual environment to correspond to the location of the in-vehicle information system 104. In navigation applications, the processor 108 identifies the location and movement of the in-vehicle information system 104 for the generation of routes to selected destinations and display of the routes in the 3D virtual environment.

During operation, the processor 108 receives weather information corresponding to the environment around the vehicle from multiple sources. In the embodiment of FIG. 1, the sources include the vehicle sensors 170, online information sources 190, and the positioning system 148. The processor 108 uses some environment data indirectly. For example, the positioning system 148 provides data pertaining the location of the vehicle, and the processor 108 uses the position data as part of a query to an online information source 190 to, for example, identify weather in the region around the vehicle or in another region along the route of the vehicle where the vehicle will be traveling in the future.

In the in-vehicle information system 104, the display device 144 is either an integrated display device, such as an LCD or other visual display device, which is integrated with a housing of the in-vehicle information system 104, or the display device 144 is an external display device that is operatively connected to the in-vehicle information system 104 through a wired or wireless interface to receive output signals from the processor 108 to generate a display of the 3D virtual environment. In an embodiment where the in-vehicle information system 104 is an in-vehicle embedded computing device, the display device 144 is an LCD or other flat panel display that is located in the console of a vehicle, or the display device 144 is a head-up display (HUD) or other projection display that displays the 3D virtual environment on a windshield or other display surface in the vehicle. Other display device embodiments include, for example, stereoscopic displays that form two different 2D images of a 3D virtual environment to simulate a true three-dimensional display of the virtual environment.

In the in-vehicle information system 104, the vehicle sensors 170 include any device in the vehicle that generates digital data corresponding to the condition of the vehicle or the environment around the vehicle that the processor 108 uses to adjust a visual depiction of the static map features. Examples of sensors that are used in different vehicle configurations include, but are not limited to, cameras, light sensors, thermometers, hygrometers, motion sensors, speedometers, range finding sensors, and the like. In some embodiments, the processor 108 uses the vehicle sensors 170 to supplement weather information data from the online weather information source 190 to detect cloud coverage levels in the region around the vehicle. In some embodiments, an in-vehicle clock is another sensor that records the time of day around the vehicle. In some embodiments, the positioning system 148 or network device 152 receive time data to set the clock and identify the position of the sun or moon in the sky at different times when the vehicle is in different geographic locations. In the example of FIG. 1, the positioning system 148 also acts as a sensor to indicate the location and optionally direction of travel and speed of the vehicle. In some vehicles, additional sensor data may be provided indirectly from subsystems that perform other functions in the vehicle.

FIG. 1 depicts an in-vehicle information system 104 as one embodiment of a hardware system that is specifically configured to generate graphics of clouds in a 3D virtual environment. Additionally, other embodiments that incorporate similar hardware components including mobile electronic devices such as smartphones, tablets, wearable devices, and the like may be specifically configured to perform the methods described herein.

Figure 2:
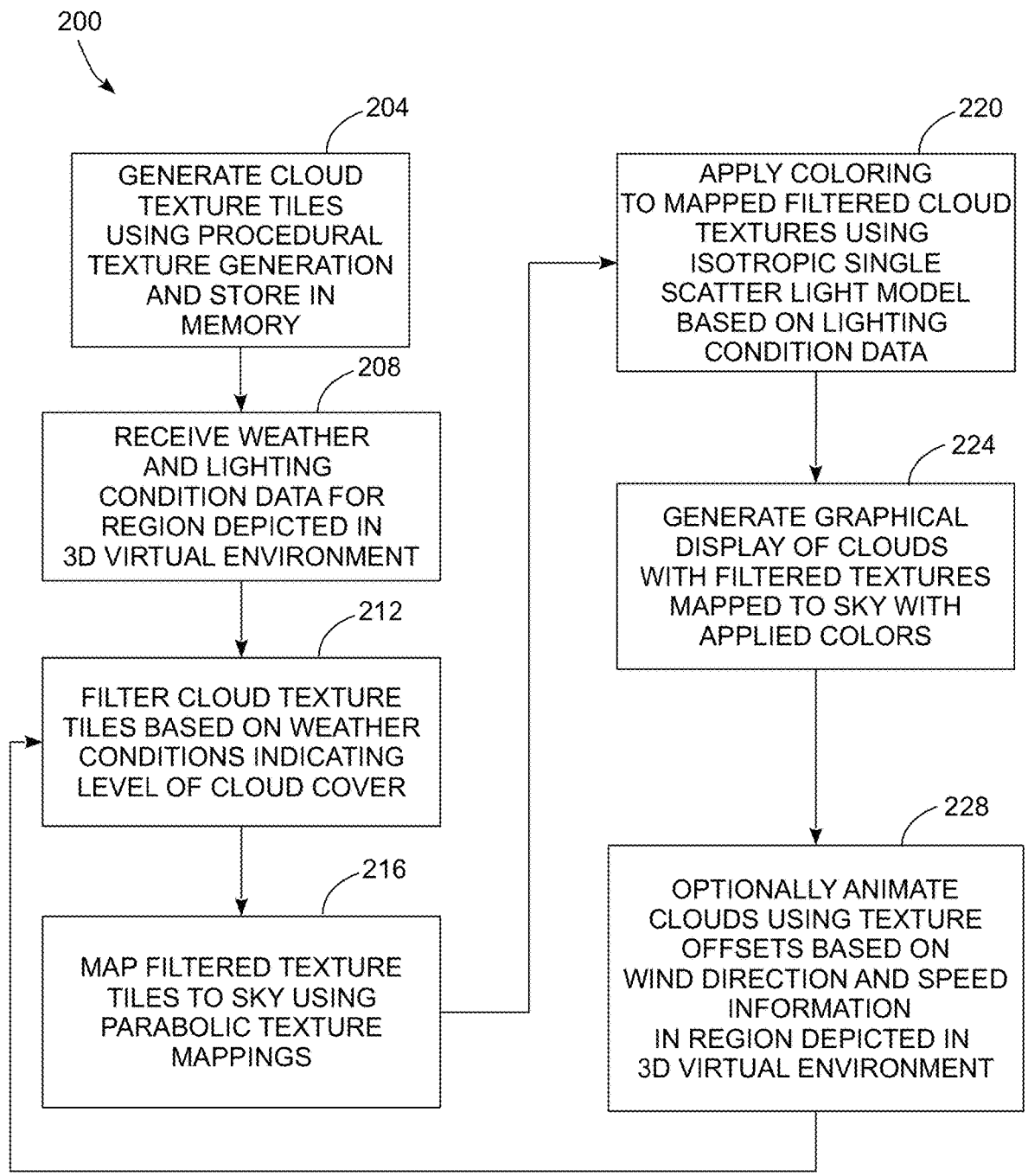
FIG. 2 is a block diagram of a process for generating graphics of a 3D virtual environment including clouds that correspond to weather conditions in a real-world region represented by the 3D virtual environment.

FIG. 2 depicts a process 200 for generating graphics of clouds in a three-dimensional virtual environment. In the description below, a reference to the process 200 performing a function or action refers to the operation of a processor to execute stored program instructions to perform the function or action in conjunction with other hardware elements. The process 200 is described in conjunction with the system 100 and the in-vehicle information system 104 for illustrative purposes.

The process 200 begins with an optional procedural texture generation process to generate one or more textures that form the basis for generating graphics of clouds in the in-vehicle information system 104 (block 204). In one embodiment, the processor 108 samples a Perlin noise source to generate one or more textures in the cloud texture data 128. The use of Perlin noise for procedural texture generation is well-known to the art and is not addressed in greater detail herein. The processing of block 204 may be performed by the processor 108 as in the example of FIG. 2. In another embodiment, the texture generation process is performed by an external computing device that generates the texture data in an offline manner. The in-vehicle information system 108 stores the previously generated cloud texture data 128 in the memory 120 prior to executing a 3D mapping program or other graphical software program application that generates the cloud graphics. Offline generation of the cloud texture data 128 reduces the computational burden of the processor 108 during operation in embodiments were the memory 120 has sufficient capacity to store the cloud texture data 128.

The process 200 continues as the in-vehicle information system 104 receives weather data for a geographic region from the online weather information sources 190 (block 208). The weather data sources include, for example, web services and other publicly available weather information systems such as the National Weather Service in the United States and equivalent weather services in other countries around the world that provide current and predicted weather condition information. The weather information includes, for example, weather data that describes cloud cover, wind speed, and wind direction, in a given geographic region. During the process 200 the in-vehicle information system 104 can receive weather data for the region in the immediate vicinity of the vehicle using, for example, location data received from the positioning system 148 to identify the geographic location of the vehicle. In another configuration, the in-vehicle information system 104 receives weather data for a geographic region that is different than the location of the vehicle, such as a destination of the vehicle that potentially lies at a great distance from the current location of the vehicle, to enable the in-vehicle information system 104 to display the cloud cover in the 3D virtual environment corresponding to the destination based on the actual cloud cover at the physical location of the destination in the real world. In some embodiments, the in-vehicle information system 104 generates graphics of the clouds that predict the current conditions in the geographic region based on current weather condition data, while in other embodiments the in-vehicle information system 104 generates graphics based on the predicted weather conditions in the geographic region at a future time using the predicted weather data. For example, if the estimated time of arrival (ETA) at a destination is four hours in the future, the in-vehicle information system 104 can retrieve predicted weather condition data from the online weather source 190 and use the predicted level of cloud cover to provide a graphical depiction of clouds at the destination at ETA of the vehicle.

During the process 200, the processor 108 applies a threshold filter to at least one cloud texture that the processor 108 retrieves from the cloud texture data 128 in the memory 120 (block 212). The threshold filtering process selects texels in the texture that are used to form cloud graphics based on the weather data that indicate the level of cloudiness in the geographic region. As described in more detail below, the threshold filter selects texels from the texture that form the shapes of clouds based on a numeric threshold selection process. In the in-vehicle information system 104, the processor 108 identifies a numeric threshold value that corresponds to the cloud coverage information in the weather data, where the numeric threshold value in some embodiments is inversely related to the level of cloud coverage. For example, in one embodiment the texel values in the texture are encoded using 8 bits of data (values in a range of 0 to 255). The processor 108 generates a numeric threshold value in the appropriate numeric range based either directly on a percentage of cloud cover from the weather data (e.g. a threshold of 128 for 50% cloud coverage, a threshold of 0 for 100% cloud cover) or a predetermined value for weather data that includes qualitative rather than directly quantitative cloud cover information (e.g. a threshold of 225 for "mostly sunny", a threshold of 180 for "partly cloudy", a threshold of 75 for "mostly cloudy", etc.). Additionally, in situations in which the weather data indicate clear sky conditions with no clouds at all, the processor 108 can omit the remainder of the process 200 to generate graphics that do not include any clouds.

In the processor 108, the threshold filter operation may be performed using the CPU 112, the GPU 116, or a combination of both hardware components. For example, in one embodiment the GPU 116 executes a fragment shader program that processes each sampled texel in a copy of the procedurally generated texture to apply the threshold. If the numeric value of a texel meets or exceeds the threshold then the fragment shader program leaves the numeric value of the texel in the texture in an unmodified state (e.g. if the threshold is 110 and the texel value is 200, the output texel value is also 200). If, however, the texel value is below the threshold, then the fragment shader sets the texel to a predetermined value, such as 0, that effectively deletes the texel from the final rendered graphics to depict gaps between portions of the clouds (e.g. if the threshold is 110 and the texel value is 97, the output texel value is set to 0). The processor 108 is configured to ignore the predetermined value during a subsequent rendering operation to ensure that the cloud is not rendered in the locations of the deleted texels. In another embodiment that employs textures with an alpha channel, the fragment shader does not change the inherent value of each texel but instead sets the alpha channel value to 1.0 (full opacity) for each texel that meets or exceeds the threshold and sets the alpha channel value to 0.0 (full transparency) to effectively delete each texel that is below the threshold. The selected texels that are not deleted in the texture form the shapes of the clouds in the texture where the threshold value affects the overall proportion of the texture that depicts clouds compared to gaps between the clouds that show the sky. In some embodiments, the CPU 112 modifies the texels in the texture by executing stored program instructions in a similar process to that described above for the GPU 116.

The process 200 continues as the processor 108 maps the filtered cloud texture to a hyperbolic surface that forms a sky dome in the three-dimensional virtual environment (block 216). The mapping process ensures that the cloud has a natural appearance when viewed from different angles in the 3D virtual environment. To achieve more realistic cloud texture mapping, the processor 108 maps the filtered cloud texture to a parabolic geometric surface that corresponds to the sky dome in the 3D virtual environment. Other mapping technologies, like spherical and planar mapping are commonly used in graphics industry to visualize sky dome. By contrast, the parabolic mapping deliver better transition from horizontal to vertical view comparing to the above two mapping based on experimental results. Additionally, the parabolic mapping could also cover spherical, planar mapping as parameters change. In most hardware embodiments, the GPU 116 includes texture mapping unit hardware that maps the filtered cloud textures to the parabolic surface.

Figure 4:
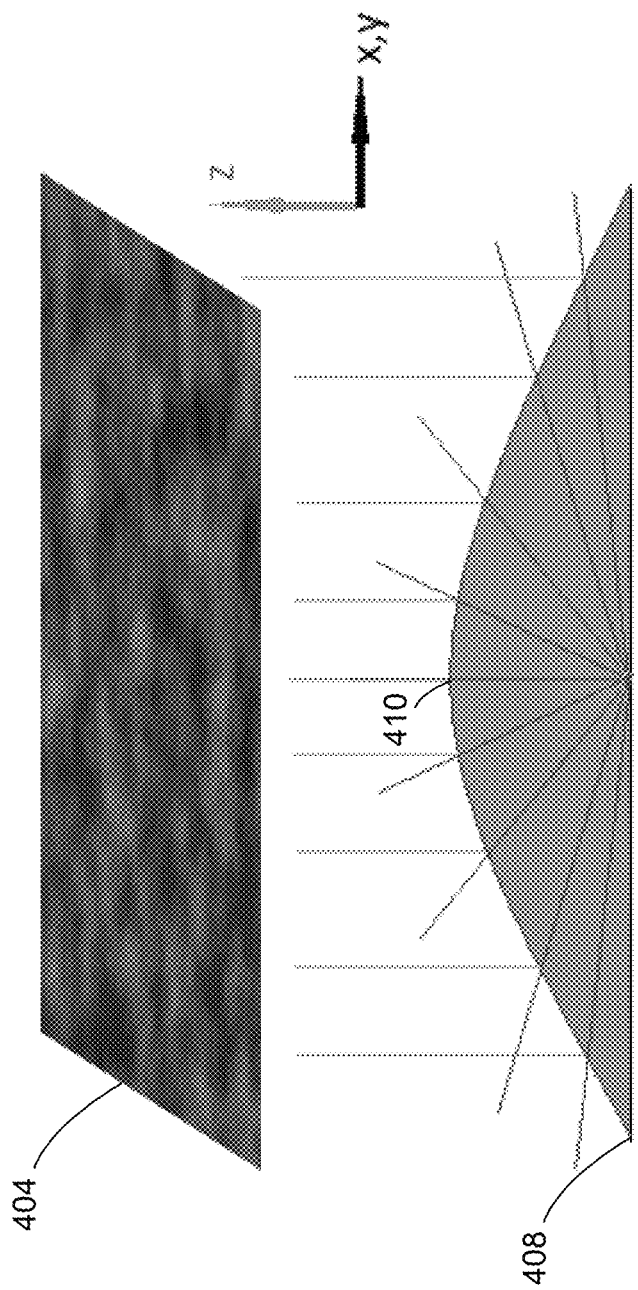
FIG. 4 is a diagram depicting a hyperbolic surface that receives mapped cloud textures in the process of FIG. 2.

FIG. 4 depicts the parabolic mapping process in greater detail including a filtered cloud texture 404 that is mapped to a parabolic geometric surface 408 that corresponds to the sky dome. Taking the center point 410 of the parabolic surface 408 as a point of view that is directly overhead from the virtual camera along the Z axis in the 3D virtual environment, the processor 108 maps the cloud noise texture will along the Z axis to the parabolic surface above the virtual camera. As depicted in FIG. 4, the center point 410 corresponds to an apex of the parabolic geometric surface. While FIG. 4 depicts a single texture 404 for illustrative purposes, in some embodiments a single filtered texture or multiple filtered textures are tiled to cover a larger area and the tiled textures are mapped to the parabolic surface 408.

Referring again to FIG. 2, the process 200 continues as the processor 108 applies a color to all of the texels in the mapped texture that correspond to the cloud (block 220). In one embodiment of the in-vehicle information 104, the processor 108 generates the color using three separate sub-texel color values corresponding to red, green, and blue color levels that the display device 144 combines together to produce a final output color of each texel in the rendered scene. As described above with reference to the processing of block 212, the processor 108 generates the shape and density of clouds using the thresholding process, but this process does not impart the final colors associated with the rendered clouds. For example, a white fair-weather cloud may have the same general size and shape as a darker storm cloud, but the two clouds have different colors. Additionally, the relative positions of the sun, moon, and potentially other light sources in the 3D virtual environment affect the colors of the clouds.

To apply colors to the cloud texels, the processor 108 applies a sub-scattering color to cloud and synthesizes the final color of cloud based on all inputs. In order to consume fewer processing resources in GPU pipeline, the process 200 implements a modified isotropic single scatter model, which is a modified version of the isotropic Mie model, to render the cloud color. While the general prior-art Mie model involves the calculation of intensity of scattered light based on a summation of an infinite series of terms, the process 200 employs a numerical approximation that is more computationally efficient than the infinite series of the Mie model while still delivering accurate cloud colors in 3D mapping applications. The processor 108 performs a simplified calculation that is described by the following function:

$$\text{cloudColor} = \text{skyColor} * (1.0 - \text{cloudIntensity}) + \text{extinctColor} * \text{cloudAmbient}$$

In the preceding function, the skyColor parameter is a default color value for the sky in the three-dimensional virtual environment (e.g. normal, fog, or sand storm) without the presence of any clouds. The cloudAmbient parameter is a default color value of the clouds that is selected as part of an overall color theme for the 3D virtual environment. The cloudIntensity parameter varies on a per-texel basis and corresponds to the value of each texel that exceeds the threshold described above mapped to a numeric range of 0.0 to 1.0. The extinctColor parameter corresponds to a level of light absorption and light transmission for each texel in the cloud texture that is based on the cloudIntensity parameter value of each texel. In one embodiment, the extinctColor parameter is determined empirically using a function or set of functions that simulates the absorption of light from the light sources in the cloud. One example of a set of three functions that map the red (R), green (G), and blue (B) sub-texel color elements of a single texel is: extinctColor.R=$e^{(-cloudIntensity*C1)}$; extinctColor.G=$e^{(-cloudIntensity*C2)}$ and extinctColor.B=$e^{(-cloudIntensity*C3)}$ where C1, C2, and C3 are empirically determined numerical coefficient values. Thus, the cloudColor value varies between texels of the cloud based on the individual texel values that affect the cloudIntensity and extinctColor parameter values to generate graphics of clouds that include texels with varying colors, such as clouds that can vary from white to darker shades of gray or other colors including clouds with other colors due to the effects of sunlight at dawn or dusk. In the processor 108, the GPU 116 can perform the color calculation on a per-texel basis using a fragment shader program or the CPU 112 can calculate the color for each texel in the cloud based on the function described above.

After the processor 108 applies the colors to the texels in the texture that has previously been mapped to the parabolic sky dome surface, the processor 108 generates a graphical display of the 3D virtual environment including the clouds that are described above (block 224). In the in-vehicle information system 104, the processor 108 generates the graphical display of the 3D virtual environment based on the location of a virtual camera within the 3D virtual environment to generate a 2D rasterized image with the display device 144 based on the portion of the 3D virtual environment that is seen through a view frustum of the virtual camera using 3D rendering techniques that are otherwise known to the art. The processor 108 also generates graphical renderings of terrain, buildings, landmarks, and other features in the 3D virtual environment in addition to the sky with the clouds. The display device 144 provides a visual depiction of a portion of the parabolic surface with the sky and the rendered clouds along with other elements with the field of view in the 3D virtual environment to a user. The graphical depiction of the clouds provides simple and easily understandable information concerning the level of cloud cover in a geographic region that is displayed in the in-vehicle information system based on the actual weather conditions received from the online weather sources 190.

Figure 3:
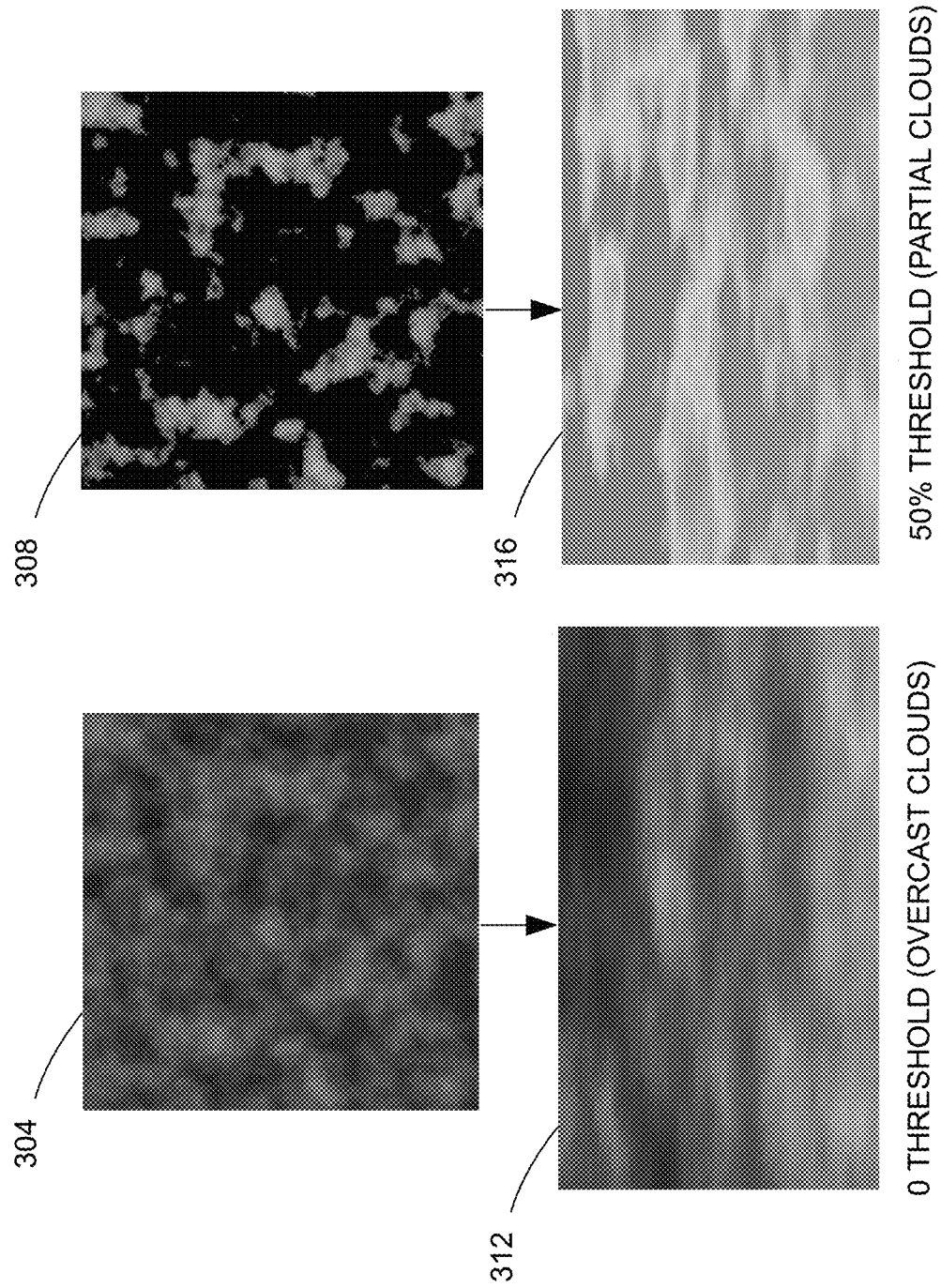
FIG. 3 is a diagram depicting procedurally generated cloud textures that are modified using a threshold filter operation in the process of FIG. 2.

FIG. 3 depicts two examples of rendered cloud graphics including the threshold filtered textures that are mapped to the parabolic sky dome and colored using the process 200 described herein. In particular, the cloud texture 304 that corresponds to an overcast cloud cover with a zero or very low filter threshold produces the rendered graphical depiction 312. The processor 108 applies a 50% threshold to generate the filtered texture 308 where the black regions in the filtered texture 308 represent gaps between the clouds. The processor 108 produces the graphical rendering 316 that includes the partial cloud cover based on the filtered texture 308 with blue sky between the gaps in the clouds. In addition to the changes in the density and shapes of the clouds based on the filtered textures, the coloring method of the process 200 enables the clouds to have different colors, such as the darker coloring in the overcast cloud rendering 312 and lighter coloring in the fair-weather cloud rendering 316. In the example of FIG. 3, both of the filtered textures 304 and 308 are based on the same underlying cloud texture that the in-vehicle information system 104 stores in the cloud texture data 128 in the memory 120. The process 200 enables the use of a single cloud texture or a small number of different cloud textures to generate graphics that depict a wide range of cloud conditions from overcast to mostly sunny without having to regenerate complex renderings of clouds for each of the different weather conditions.

As described above, the process 200 provides a computationally efficient method to generate a graphical depiction of clouds in a 3D virtual environment. In some embodiments, the in-vehicle information system 104 also animates the clouds over time to depict the effects of wind on the clouds in the 3D virtual environment (block 228). The processor 108 receives the wind speed and direction data with the weather condition data from the online weather data sources 190 as is described above with reference to the processing of block 208. In one embodiment, the processor 108 animates cloud movement by applying a spatial offset to the position of the texture mapping for the cloud texture to the hyperbolic surface over a series of rendered frames to show movement of the clouds in with a direction and speed that corresponds to the wind conditions, where each frame includes a single graphical depiction of the clouds in the three-dimensional virtual environment and the process 200 produces a series of frames with different renderings of the clouds to produce an animated depiction of the clouds in the three-dimensional virtual environment.

In another embodiment, the processor 108 also changes the shapes of the clouds over time to mimic the changes in shapes of actual clouds in the sky. In this embodiment, the processor 108 uses a second cloud texture that is stored in the cloud texture data 128 to serve as an offset texture from the currently rendered clouds that are produced using a first cloud texture to generate a third texture based on a combination of texels in the first cloud texture and the second cloud texture. The processor 108 generates an offset between the two textures that changes between frames of the animation to produce a different cloud texture for each frame of the animation. In the in-vehicle information system 104, the processor 108 generates a combination of the two textures for the animated cloud graphics using the CPU 112, the GPU 116, or a combination of both hardware components.

For example, in one embodiment the processor 108 generates a third texture with texels that are generated from a combination of the texels in the first cloud texture and the second cloud texture using, for example, the following function: $texel_{u,v}=(first\_texture\ [u,v]+second\_texture\ [u+texOffset_u, v+texOffset_v])/2$ where u, v represent two-dimensional coordinates of a texel in both the first and second textures and $texOffset_u$ and $texOffset_v$ are numeric offset values for a different location in the second texture that change between each rendered frame to depict animation of the clouds. In some embodiments the $texOffset_u$ and $texOffset_v$ value starts at 0 for an initial frame of the animation sequence and the processor 108 increases or decreases the texture offset values based on the weather data by varying amounts in subsequent frames to depict the effects of both the wind direction and the wind speed on the clouds. The function above produces an arithmetic average of the two texel values, although in other embodiments the two texel values can be combined in a manner other than an arithmetic average. The processor 108 uses the texels that are produced from the combination of the two textures to generate a third cloud texture that serves as an input to produce another filtered texture with different cloudIntensity values for each texel during each frame of the animation and uses the modified texel values to return to the processing described above with reference to blocks 212-224 to produce a series of graphical renderings for an animated depiction of clouds in the three-dimensional virtual environment.

Figure 5:
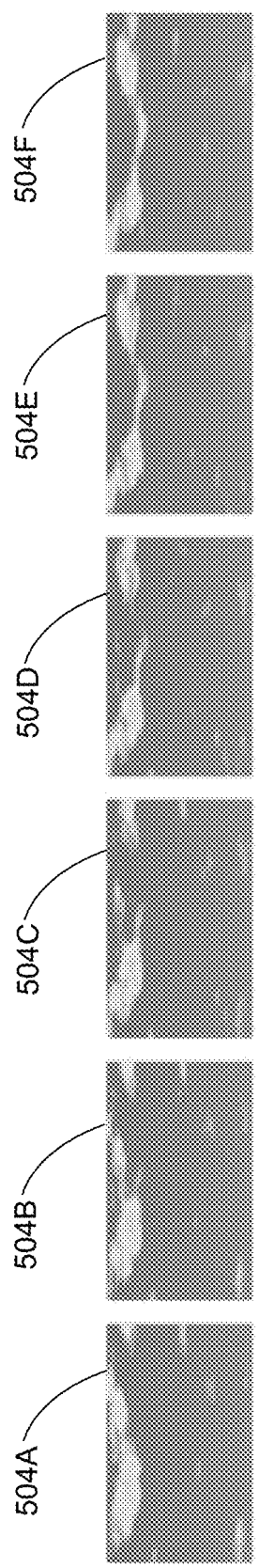
FIG. 5 is a diagram depicting an animation of cloud graphics to depict wind speed and direction in the 3D virtual environment.

The combination of the first cloud texture and the second cloud texture with varying offset values produces a different filtered texture for rendering each additional graphics frame of the three-dimensional virtual environment that depicts both the movement and change in shape of the clouds in the three-dimensional virtual environment. The process 200 continues for additional frames as the processor 108 generates a fourth texture based on a combination of the first and second cloud textures with a second offset between the first and second textures as an input to generate a second filtered texture for a subsequent frame of the animation, and the in-vehicle information system 104 performs additional iterations of the process 200 to generate additional frames of the animation as described above. This process delivers plausible behavior of clouds in a 3D navigation system, including: cloud rolling, vanishing, emerging and blending as shown in the animation sequence of FIG. 5. In FIG. 5, the in-vehicle information system 104 generates a progression of rendered frames of the clouds with multiple image frames 504A-504F generated in a time sequence to depict the movements of clouds in the sky based on the wind speed and wind direction.

The embodiments described herein provide improvements to computer technology and, more specifically, to the operation of computerized systems that are specifically configured to generate graphics. Non-exclusive examples of improvements described herein include a process for generating graphical renderings of clouds in a three-dimensional virtual environment that requires fewer computational resources compared to prior-art cloud rendering techniques, which broadens the base of computerized devices that can efficiently render the clouds in a 3D virtual environment compared to less efficient prior art rendering techniques. The embodiments described herein also enable the efficient rendering of clouds in a 3D virtual environment that correspond to the actual cloud coverage conditions in a geographic region that is depicted in the 3D virtual environment, which improves the function of 3D mapping and navigation applications.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating graphics of a three-dimensional (3D) virtual environment comprising:
    receiving, with a processor, weather data including cloud coverage information corresponding to a geographic region;
    retrieving, with a processor, a texture corresponding to clouds from a memory;
    generating, with the processor, a filtered texture based on a threshold filter applied to the texture, the generating of the filtered texture including (i) identifying a numeric threshold value corresponding to the cloud coverage information in the weather data and (ii) deleting a plurality of texels in the texture that have a numeric value that is less than the numeric threshold value to generate the filtered texture corresponding to a level of cloud coverage corresponding to the cloud coverage information in the weather data;
    mapping, with the processor, the filtered texture to a geometric surface corresponding to a sky dome in the 3D virtual environment;
    coloring, with the processor, a plurality of texels in the mapped filtered texture on the geometric surface stored in the memory based on an isotropic single-scatter color model; and
    generating, with a display device connected to the processor, a graphical depiction of the 3D virtual environment corresponding to the geographic region including at least a portion of the geometric surface corresponding to the sky dome with clouds based on the plurality of texels of the filtered texture that are colored and mapped to the geometric surface.

2. The method of claim 1, the deleting further comprising:
    setting, with the processor, a numeric value of a texel in the plurality of texels that are deleted to a predetermined numeric value.

3. The method of claim 1, the deleting further comprising:
    setting, with the processor, an alpha channel value of a texel in the plurality of texels that are deleted to a value that indicates the texel is transparent.

4. The method of claim 1, the mapping of the texture further comprising:
    mapping, with the processor, the filtered texture to a parabolic geometric surface corresponding to the sky dome in the 3D virtual environment.

5. The method of claim 1, the coloring of the plurality of texels further comprising:
    identifying, with the processor, a color cloudColor for at least one texel in the plurality of texels in the mapped filtered texture using the following function:

$$cloudColor = skyColor * (1.0 - cloudIntensity) + extinctColor * cloudAmbient$$

where skyColor is a parameter corresponding to a default color of a sky in the three-dimensional virtual environment, cloudIntensity is a parameter corresponding to a value of the at least one texel, extinctColor is a parameter corresponding to a level of light absorption and light transmission based on the cloudIntensity parameter of the at least one texel, and cloudAmbient is a parameter corresponding to a default color value for the at least one texel.

6. The method of claim 1, the receiving of the weather data further comprising:
    receiving, with the processor and a wireless network device, the weather data from an online weather information source.

7. A method for generating graphics of a three-dimensional (3D) virtual environment comprising:
    receiving, with a processor, weather data including cloud coverage information, wind speed information, and wind direction information corresponding to a geographic region;
    retrieving, with a processor, a first texture corresponding to clouds from a memory;
    retrieving, with a processor, a second texture corresponding to clouds from the memory, the second texture being different than the first texture;
    generating, with the processor, a third texture corresponding a combination of the first texture and the second texture with a first offset between the first texture and the second texture corresponding to the wind speed information, and the wind direction information;
    generating, with the processor, a first filtered texture based on a threshold filter applied to the third texture, the generating including a filter threshold that corresponds to the cloud coverage information in the weather data;
    mapping, with the processor, the first filtered texture to a geometric surface corresponding to a sky dome in the 3D virtual environment;
    coloring, with the processor, a plurality of texels in the mapped first filtered texture on the geometric surface stored in the memory based on an isotropic single-scatter color model;
    generating, with a display device connected to the processor, a first graphical depiction of the 3D virtual environment corresponding to the geographic region including at least a portion of the geometric surface corresponding to the sky dome with clouds based on the plurality of texels of the first filtered texture that are colored and mapped to the geometric surface;
    generating, with the processor, a fourth texture corresponding to another combination of the first texture and the second texture with a second offset between the first texture and the second texture corresponding to the wind speed information, and the wind direction information, the second offset being different than the first offset;
    generating, with the processor, a second filtered texture based on the threshold filter applied to the fourth texture, the generating including the filter threshold that corresponds to the cloud coverage information in the weather data;
    mapping, with the processor, the second filtered texture to the geometric surface corresponding to a sky dome in the 3D virtual environment;
    coloring, with the processor, a plurality of texels in the mapped second filtered texture on the geometric surface stored in the memory based on the isotropic single-scatter color model; and
    generating, with the display device, a second graphical depiction of the 3D virtual environment corresponding to the geographic region including at least a portion of the geometric surface corresponding to the sky dome with clouds based on the plurality of texels of the second filtered texture that are colored and mapped to the geometric surface to produce an animated depiction of the clouds.

8. A system for generating graphics of a three-dimensional (3D) virtual environment comprising:
   a display device;
   a network device;
   a memory configured to store:
      programmed instructions;
      a texture corresponding to clouds; and
      a geometric surface corresponding to a sky dome in the 3D virtual environment; and
   a processor operatively connected to the display device, the network device, and the memory, the processor being configured to execute the programmed instructions to:
      receive weather data including cloud coverage information corresponding to a geographic region using the network device;
      retrieve the texture corresponding to clouds from the memory;
      generate a filtered texture based on a threshold filter applied to the texture, the generating including a filter threshold that corresponds to the cloud coverage information in the weather data;
      map the filtered texture to a geometric surface corresponding to a sky dome in the 3D virtual environment;
      color a plurality of texels in the mapped filtered texture on the geometric surface stored in the memory based on an isotropic single-scatter color model, the processor being further configured to:
         identify a color cloudColor for at least one texel in the plurality of texels in the mapped filtered texture using the following function:
         cloudColor=skyColor*(1.0−cloudIntensity)+ extinctColor*cloudAmbient, where skyColor is a parameter corresponding to a default color of a sky in the three-dimensional virtual environment, cloudIntensity is a parameter corresponding to a value of the at least one texel, extinctColor is a parameter corresponding to a level of light absorption and light transmission based on the cloudIntensity parameter of the at least one texel, and cloudAmbient is a parameter corresponding to a default color value for the at least one texel; and
      generate a graphical depiction of the 3D virtual environment corresponding to the geographic region including at least a portion of the geometric surface corresponding to the sky dome with clouds based on the plurality of texels of the filtered texture that are colored and mapped to the geometric surface using the display device.

9. The system of claim 8, the processor being further configured to:
   identify a numeric threshold value corresponding to the cloud coverage information in the weather data; and
   delete a plurality of texels in the texture that have a numeric value that is less than the numeric threshold value to generate the filtered texture corresponding to a level of cloud coverage corresponding to the cloud coverage information in the weather data.

10. The system of claim 9, the processor being further configured to:
    set a numeric value of a texel in the plurality of texels that are deleted to a predetermined numeric value.

11. The system of claim 9, the processor being further configured to:
    set an alpha channel value of a texel in the plurality of texels that are deleted to a value that indicates the texel is transparent.

12. The system of claim 8, the processor being further configured to:
    map the filtered texture to a parabolic geometric surface stored in the memory, the parabolic geometric surface corresponding to the sky dome in the 3D virtual environment.

13. The system of claim 8, wherein the display device, the network device, the memory and the processor are integrated into an in-vehicle information system.

14. The system of claim 8, wherein the display device, the network device, the memory and the processor are integrated into a mobile electronic device.

* * * * *